United States Patent
Reese, Jr. et al.

(10) Patent No.: US 6,845,947 B1
(45) Date of Patent: Jan. 25, 2005

(54) AIRCRAFT CANOPY JETTISON APPARATUS WITH AIRBAG

(75) Inventors: Milton L. Reese, Jr., La Plata, MD (US); Edward G. Tersine, Indian Head, MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 10/681,499

(22) Filed: Oct. 9, 2003

(51) Int. Cl.[7] .................................................. B64C 1/00
(52) U.S. Cl. ............ 244/120; 244/122 A; 244/122 AF; 244/122 AE; 244/122 AG
(58) Field of Search ............................ 244/120, 122 A, 244/122 AF, 122 AG, 122 AE; 89/1.57, 1.6, 1.1

(56) References Cited

U.S. PATENT DOCUMENTS

| | | | | |
|---|---|---|---|---|
| 2,403,250 A | * | 7/1946 | Verhagen | 244/121 |
| 3,561,703 A | * | 2/1971 | Stencel | 244/121 |
| 3,778,010 A | * | 12/1973 | Potts et al. | 244/121 |
| 3,806,069 A | * | 4/1974 | Galton | 244/122 AF |
| 3,885,761 A | * | 5/1975 | Pendergast et al. | 244/121 |
| 4,301,707 A | * | 11/1981 | Schimmel et al. | 244/122 AF |
| 5,104,067 A | * | 4/1992 | McIntyre et al. | 244/122 AF |
| 5,301,904 A | * | 4/1994 | Guill | 244/122 AF |
| 5,443,285 A | * | 8/1995 | Boll | |
| 5,525,847 A | * | 6/1996 | Aronne | 244/122 AE |
| 5,702,896 A | * | 12/1997 | Collins et al. | |
| 5,954,296 A | * | 9/1999 | Jahsman et al. | 244/121 |
| 6,266,926 B1 | * | 7/2001 | Figge et al. | |
| 6,752,355 B1 | * | 6/2004 | Wood | 244/122 AF |

\* cited by examiner

*Primary Examiner*—Michael J. Carone
*Assistant Examiner*—Lulit Semunegus
(74) *Attorney, Agent, or Firm*—Mark Homer

(57) ABSTRACT

A method of removing a canopy from a cockpit of an aircraft comprising providing an airbag in the cockpit adjacent the canopy; inflating the airbag; and as the airbag inflates, applying a force to the canopy from the inflating airbag to thereby jettison the canopy.

15 Claims, 8 Drawing Sheets

Eq 1: $\sum M_a = I_a \alpha_1$

Eq 2: $\sum M_a = M_{input} - W_g B$

Eq 3: $M_{input} - W_g B = I_a \alpha_1$

Eq 4: $\alpha_1 = \dfrac{M_{input} - W_g B}{I_a}$

Eq 5: $\sum M_a = I_a \alpha_2$

Eq 6: $\sum M_a = M_{input} - W_g B + F_{add} D$

Eq 7: $M_{input} - W_g B + F_{add} D = I_a \alpha_2$

Eq 8: $\alpha_2 = \dfrac{M_{input} - W_g B + F_{add} D}{I_a}$

AIRCRAFT CANOPY JETTISON APPARATUS WITH AIRBAG

STATEMENT OF GOVERNMENT INTEREST

The invention described herein may be manufactured and used by or for the Government of the United States of America for government purposes without the payment of any royalties therefor.

BACKGROUND OF THE INVENTION

The invention relates in general to aircraft canopy jettison apparatus and in particular to aircraft canopy jettison apparatus that include an airbag.

There are three known ways to jettison an aircraft canopy during an emergency egress situation. The three ways are rocket motors, canopy thruster(s), and canopy fragilization. All three have advantages and disadvantages that dictate the effectiveness of a pilot's safe egress from an aircraft.

Many older military aircraft still in service use a canopy thruster in combination with mechanical linkages to remove the canopy from an aircraft. Some of the limitations of using a canopy thruster have been seen over the past few years. Timing is a key factor to ensuring the successful egress of aircrew from an aircraft. The use of mechanical linkages to assist in the removal has a strong dependence on the resilience of these linkages. The failure of one part in the series of linkages can cause the canopy to remain attached to the aircraft or cause a delay in the timing of events and possible injury to the aircrew.

Canopy jettison by way of rocket motors is currently used in military aircraft. One problem with using rocket motors is the extreme amounts of noise generated, which can damage an aircrew's hearing. Another problem with using rocket motors is the proximity of the rocket plume to the aircrew, which can cause serious injury to the aircrew.

Canopy fragilization has recently been incorporated into new aircraft designs over the past decade as a means for canopy removal during an emergency egress situation. One disadvantage of canopy fragilization is the use of explosives, in close proximity to the aircrew, to blow the transparent glass out of the canopy's metal frame. One concern when using this method is the likelihood of fragments hitting the aircrew. Another disadvantage is the noise that may be encountered due to the proximity of the aircrew to the explosive charge. One key factor to a successful disintegration of the transparent glass is in the determination of how much explosive material is needed to fragment the transparent part of the canopy into small pieces.

SUMMARY OF THE INVENTION

The present invention uses airbag technology to perform and/or assist in the work function of canopy removal for an aircraft during an emergency egress. In general, the airbag system comprises an inflatable airbag and a cartridge actuated device (CAD). The operation of the airbag starts by the initiation of the CAD. The CAD outputs gas that inflates the airbag. As the airbag begins to inflate, it forces the canopy open. Given the proper placement of the airbag, the distributed force applied to the canopy causes the canopy to be jettisoned from the aircraft. The airbag may be fixed to the airframe, canopy or ejection seat. The adaptability of an airbag system allows for an upgrade of existing aircraft's egress system; thereby serving to improve or solve escape path clearance related issues.

The invention will be better understood, and further objects, features, and advantages thereof will become more apparent from the following description of the preferred embodiments, taken in conjunction with the accompanying drawings.

BRIEF DESCRIPTION OF THE DRAWINGS

In the drawings, which are not necessarily to scale, like or corresponding parts are denoted by like or corresponding reference numerals.

DETAILED DESCRIPTION OF THE PREFERRED EMBODIMENTS

Figure 1:
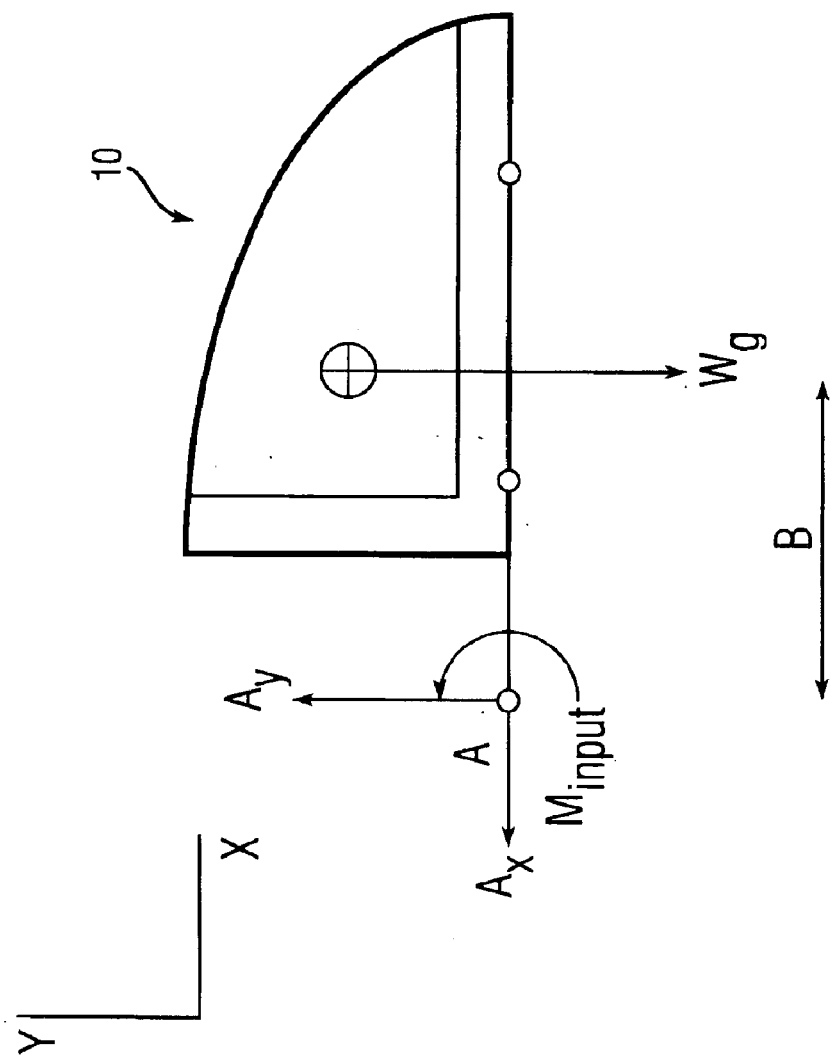
FIG. 1 is a force diagram of a canopy without an airbag.
Figure 2:
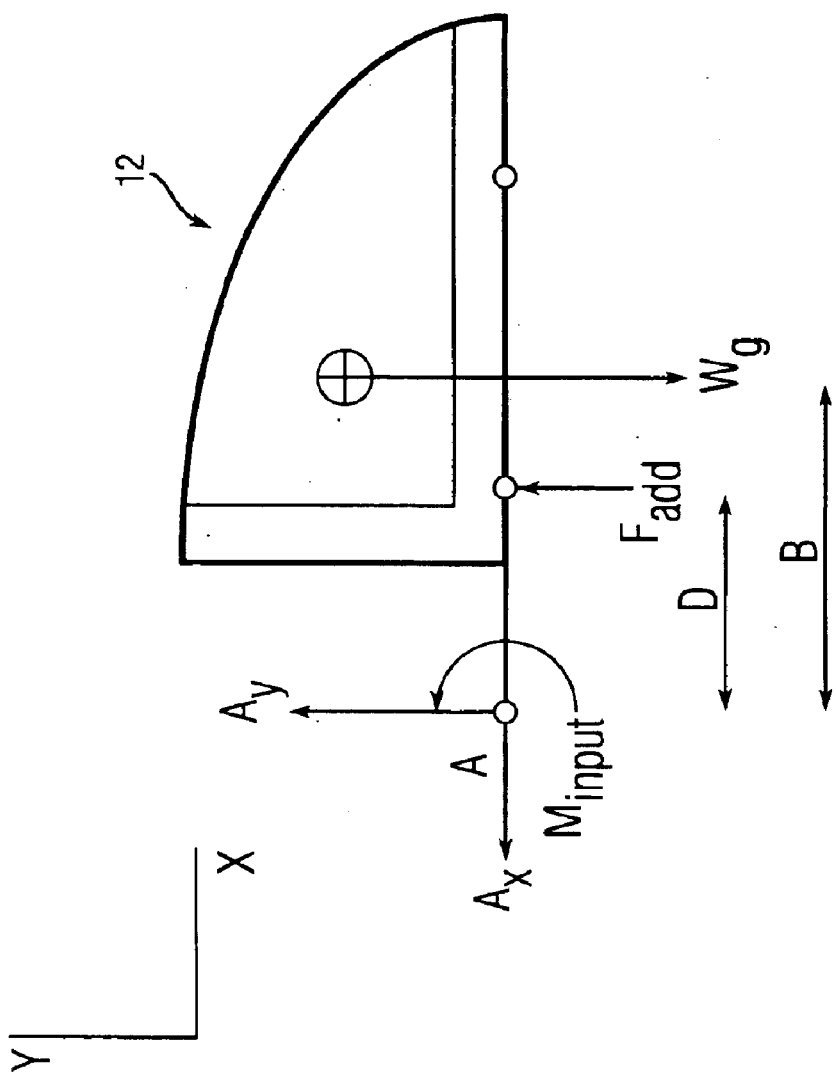
FIG. 2 is a force diagram of a canopy with an airbag.

FIG. 1 is a force diagram of a canopy 10 without an airbag and FIG. 2 is a force diagram of a canopy 12 with an airbag. FIGS. 1 and 2 represent the difference between using an airbag (FIG. 2) as an additional force input to an existing canopy jettison system and one without the airbag (FIG. 1). The following analysis assumes that there is no air resistance and at the instant the canopy begins movement that $A_x=0$ and the angular velocity (w)=0. Equations 1 and 5 in FIGS. 1 and 2, respectively, are the equations for angular motion about a fixed point. Equations 1–4 relate to FIG. 1 and equations 5–8 relate to FIG. 2. The equations 1–8 are shown on the Figs. for clarity. The variables of the equations are:

A: the axis of rotation point for the canopy.

$A_x$: the reaction force in the positive x-direction. Units are (lbf) or (N)

$A_y$: the reaction force in the positive y-direction. Units are (lbf) or (N)

Minput: the initial momentum that is given to the canopy from a pre-existing canopy jettison system. Units are (ft–lbf) or (N–m).

Fadd: the force that is generated from the airbag. Units are (lbf) or (N)

D: the distance of Fadd relative to the axis of rotation located at point A. Units are (ft) or (m)

Wg: the weight due to gravity of the canopy, which is located at the canopy's center of gravity (c.g). Units are (lbf) or (N)

B: the distance of Wg relative to the axis of rotation located at point A. Units are (ft) or (m)

$EM_A$: the sum of the moments about point A. Units are (ft–lbf) or (N–m)

α: the angular acceleration. Units are radians per second squared.

I: the mass moment of inertia. Units are (slug-ft$^2$) or (kg–m$^2$).

In FIG. 2, Fadd, which is located by the distance D, can be positioned anywhere horizontally on the canopy 12 to get an increase in acceleration. This allows for a faster canopy removal time. A comparison of equations 4 and 8 from FIGS. 1 and 2, respectively, shows that $α_2$ is greater than $α_1$.

Thus, the angular acceleration of the canopy 12 with the airbag is faster than the angular acceleration of the canopy 10 without the airbag. The total momentum that is being applied to the canopy 12 is greater than that for canopy 10. The increased momentum causes an increase in the overall distance relative to the starting position.

Figure 3:
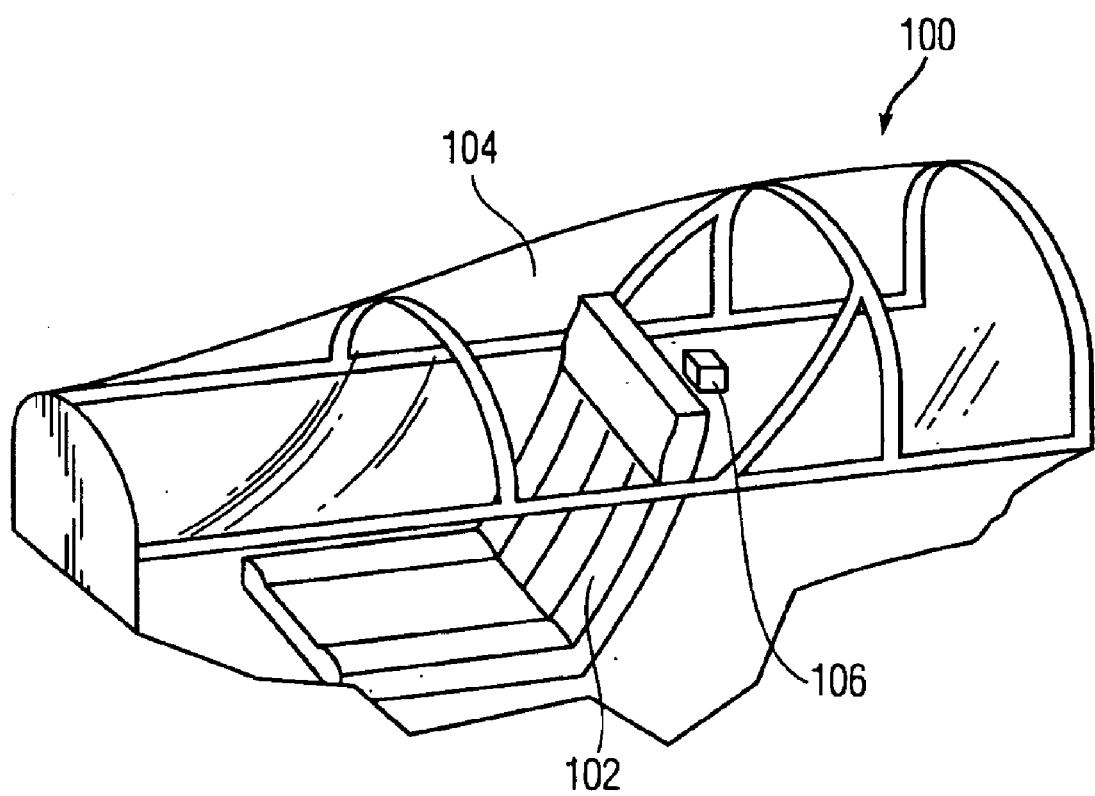
FIG. 3 is a perspective view of a cockpit portion of an aircraft with the fuselage skin removed for clarity.

The size and shape of the airbag is dependent upon the space limitations inside the cockpit. In general, the amount of force required to jettison a canopy of a given shape, size, and weight determines the size and shape of the airbag. The position of the airbag in the cockpit depends on the best mounting surface available on the inside of the cockpit. For example, the airbag may be fixed to the airframe, canopy or ejection seat. FIG. 3 is a perspective view of a cockpit portion of an aircraft 100 with the fuselage skin removed for clarity. In FIG. 3, the cockpit portion includes a pilot seat 102, a transparent canopy 104 and an airbag 106. The airbag 106 is mounted on a bulkhead behind the pilot seat 102.

Figure 4:
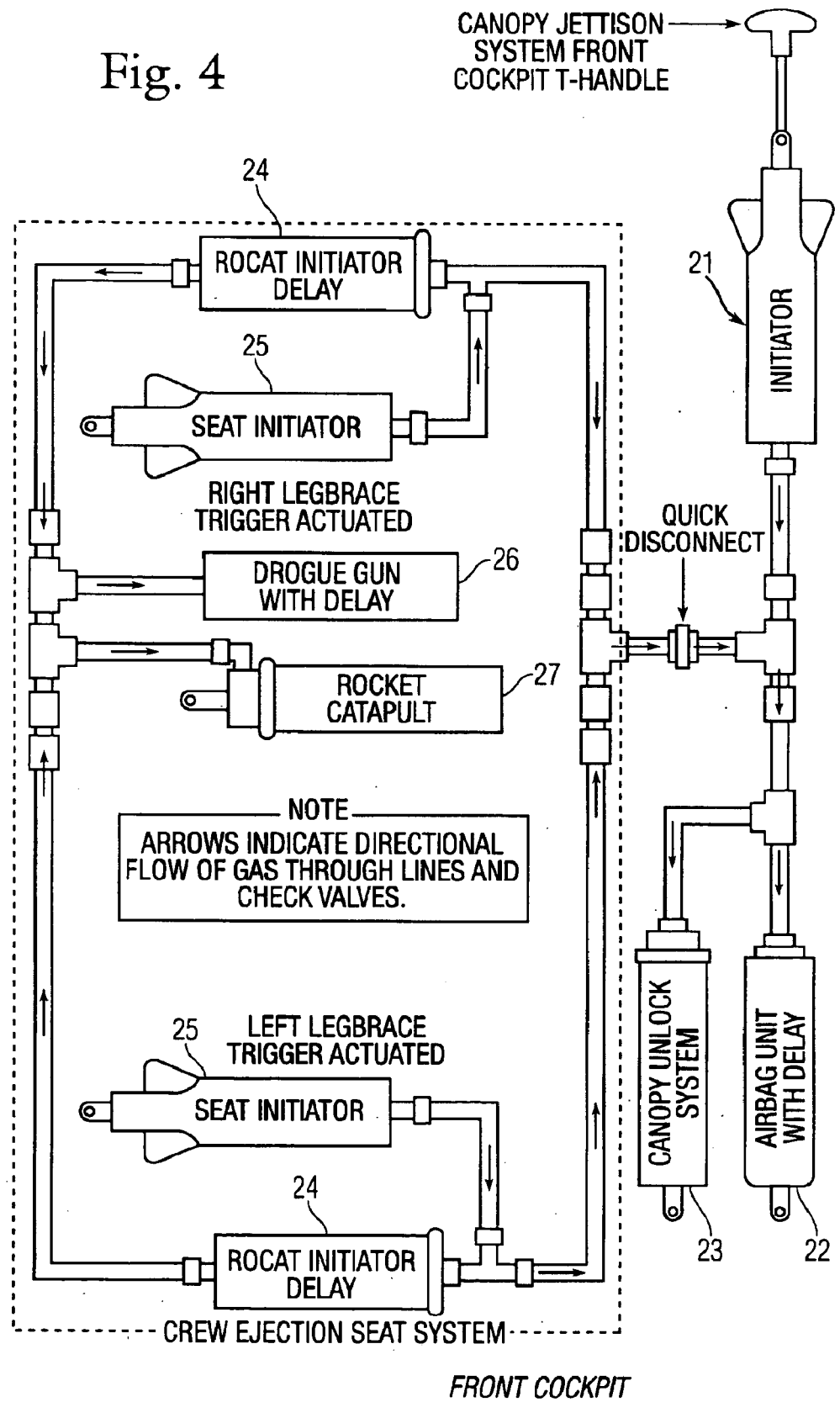
FIG. 4 is a schematic diagram of an apparatus including a gas initiated airbag for canopy jettison.

FIG. 4 is a schematic diagram of an apparatus including a gas initiated airbag for canopy jettison. Initiator 21, for example, a CAD, initiates the canopy jettison and ejection seat sequence. (A CAD is a small, self-contained energy source that is used to perform mechanical work.) An air bag unit 22 with a built in time delay is fluidly connected to the initiator 21. A canopy unlock system 23 is also fluidly connected to the initiator 21. The canopy unlock system 23 unlocks the canopy thereby allowing the canopy to move freely. Other components of the apparatus include two ejection seat initiators 25 that can function the same as initiator 21, that is, the ejection seat initiators 25 can initiate both the canopy jettison and ejection seat sequence. Two rocket catapult (ROCAT) delay units 24 ensure the proper firing of the drogue gun and rocket catapult. The drogue gun 26 is used to stabilize the seat. The rocket catapult 27 provides the main thrust that launches the pilot and seat out of the cockpit.

Initiation of the airbag 22 begins with activation of one of the initiator 21 or an ejection seat initiator 25. The initiator 21 or ejection seat initiator 25 releases gas into the fluid lines that interconnect the system components. The input signal of gas strikes a firing pin in the air bag unit 22. The firing pin strikes the CAD of the air bag, causing the CAD to release exhaust gases into the air bag. As the air bag fills up and expands, it applies a force to the canopy.

Figure 5:
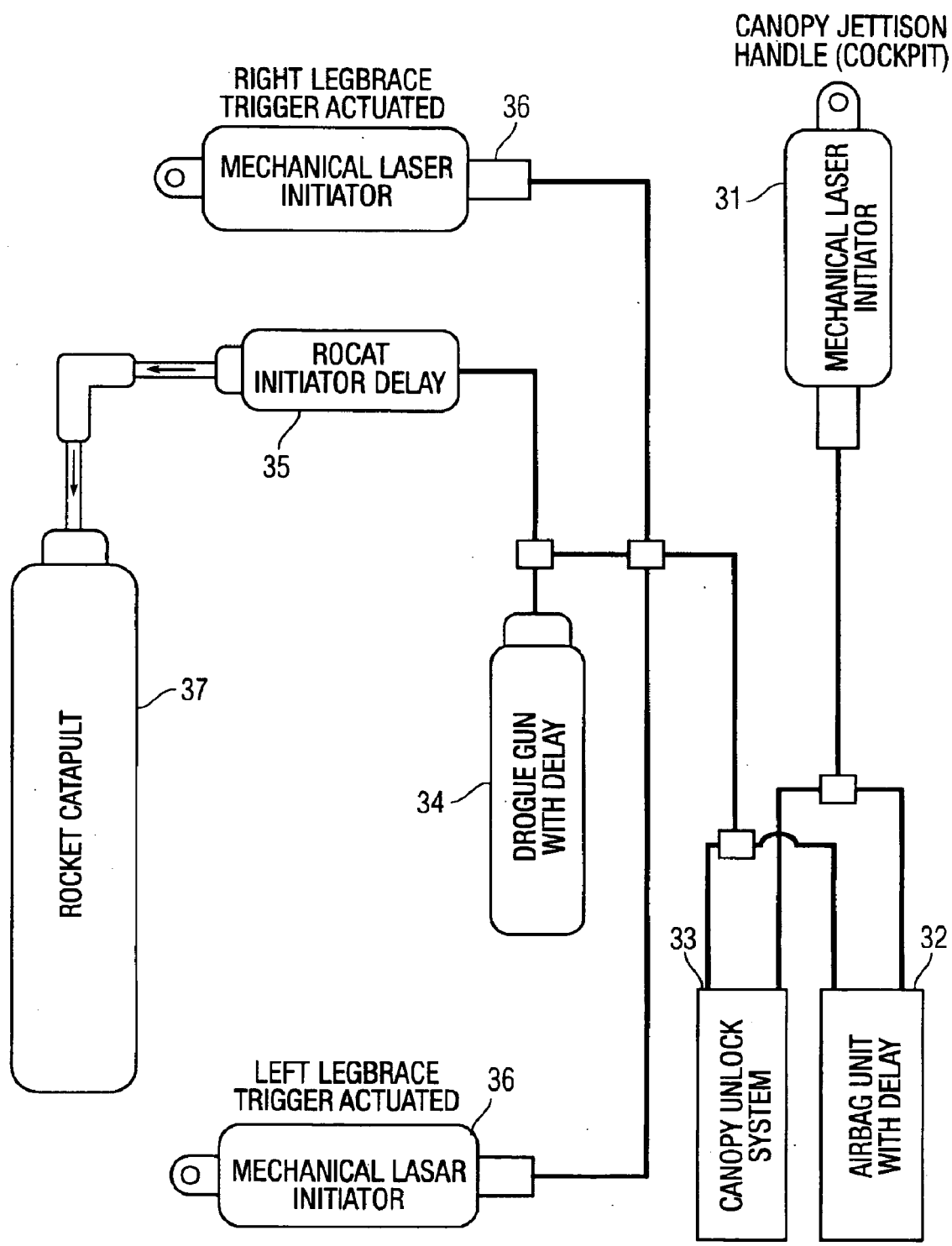
FIG. 5 is a schematic diagram of an apparatus including a laser initiated airbag for canopy jettison.

FIG. 5 is a schematic diagram of an apparatus including a laser initiated airbag 32 for canopy jettison. A mechanical laser initiator 31 is located in the cockpit and sends a pulse to initiate the canopy jettison only. Laser initiated airbag 32 includes a CAD and a built in time delay. Canopy unlock system 33 includes a laser initiated CAD and the mechanism used to unlock the canopy from the airframe. Drogue gun 34 includes a laser initiated CAD with a built in time delay. A laser initiated rocket catapult (ROCAT) time delay 35 supplies a hot gas output to rocket catapult 37. Dual mechanical laser initiators 36, disposed on the ejection seat, send a laser pulse to initiate canopy removal and the seat ejection sequence (rocket catapult and drogue gun). The rocket catapult 37 provides the main thrust that launches the pilot and seat out of the cockpit.

Figure 6:
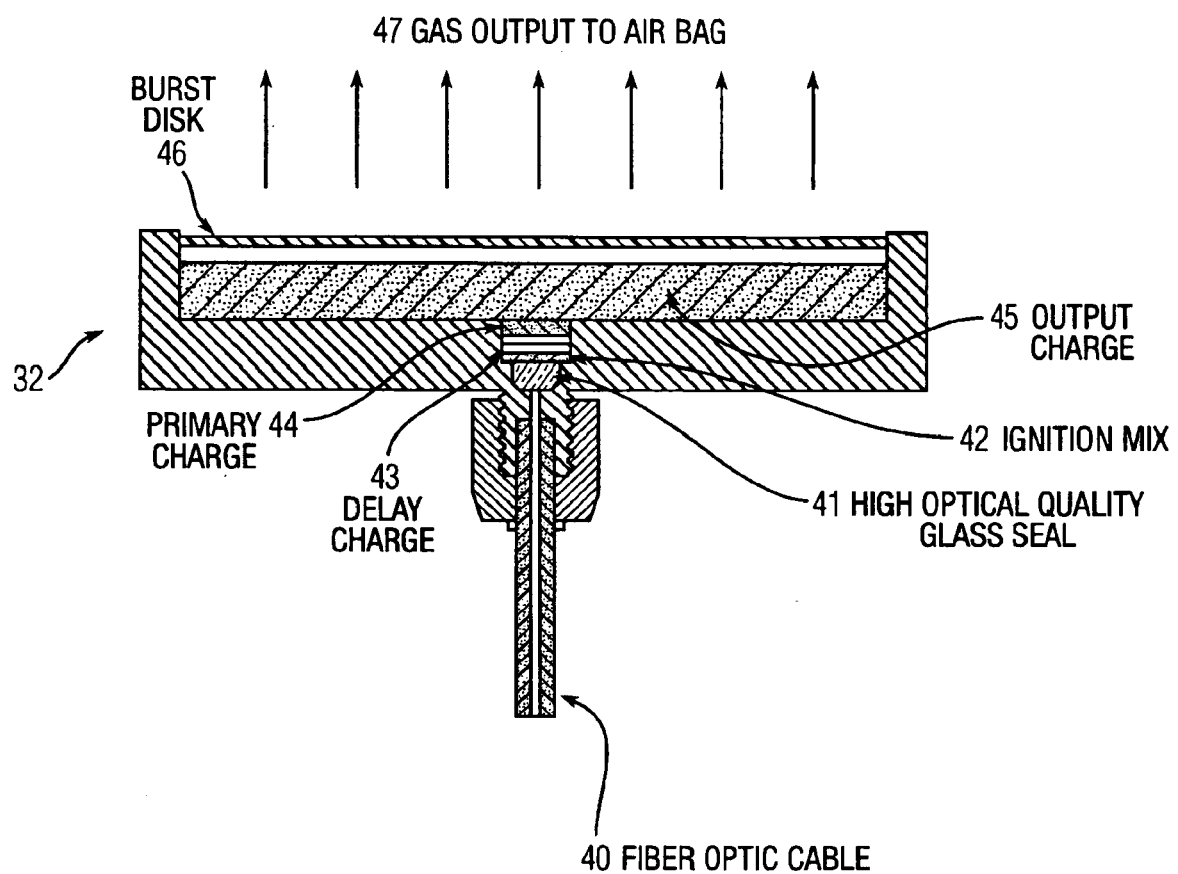
FIG. 6 is a schematic side view of a portion of a laser initiated airbag.

FIG. 6 is a side view of a portion of a laser initiated airbag 32. A fiber optic cable 40 carries a laser pulse signal from the cockpit mechanical laser initiator 31 or one of the dual mechanical laser initiators 36, disposed on the ejection seat, to the airbag 32. The laser signal passes through a high optical quality glass seal 41 to an ignition charge 42. The laser signal activates the ignition charge 42, which activates the delay charge 43. After the delay, the delay charge 43 activates the primary charge 44, which activates the output charge 45. The output charge 45 produces gases that break the burst disk 46 and then fill and expand the airbag 32.

Figure 7:
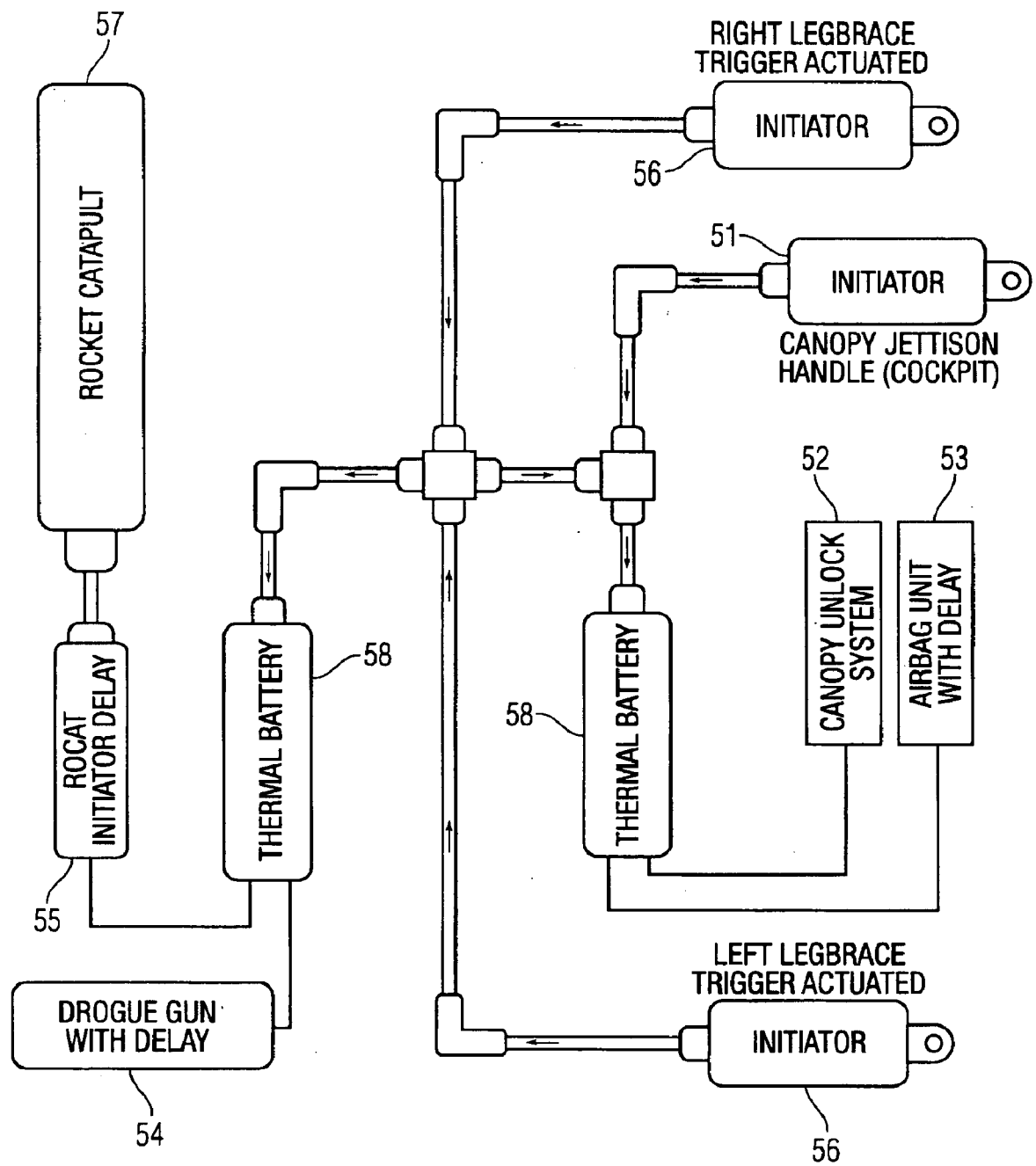
FIG. 7 is a schematic diagram of an apparatus including an electrically initiated airbag for canopy jettison.

FIG. 7 is a schematic diagram of an apparatus including an electrically initiated airbag 53 for canopy jettison. A cockpit initiator 51 sends a hot gas signal to initiate canopy jettison only. Electrically initiated canopy unlock system 52 includes a CAD and the mechanism used to unlock the canopy from the airframe. Electrically initiated airbag 53 includes a CAD and a time delay. Electrically initiated drogue gun 54 includes a CAD with a built in time delay. Electrically initiated rocket catapult (ROCAT) time delay 55 outputs hot gas to rocket catapult 57. Dual initiators 56 on the ejection seat send a hot gas signal to initiate both canopy removal and the ejection sequence (rocket catapult and drogue gun). Rocket catapult 57 provides the main thrust that launches the pilot and seat out of the cockpit. Thermal battery 58 converts chemical energy to electrical energy for signal transfer and initiation of CADs.

Figure 8:
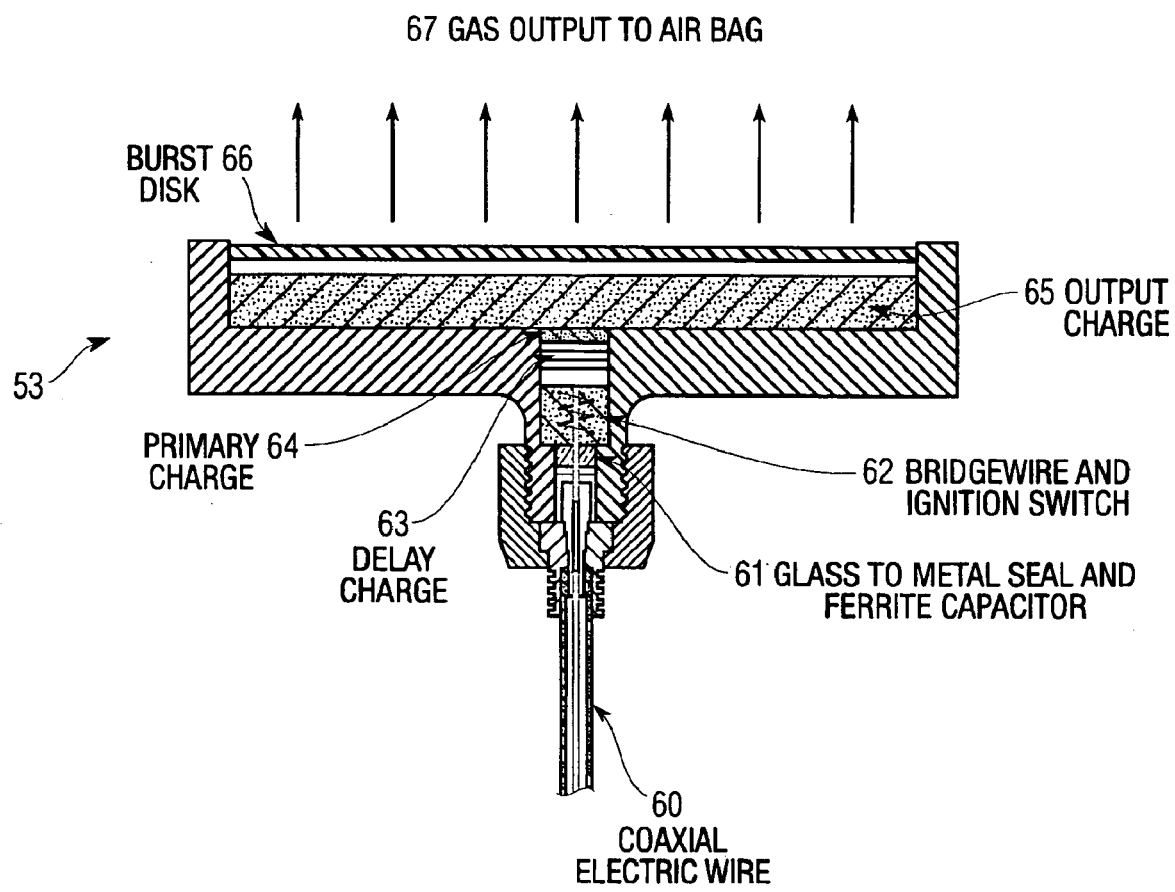
FIG. 8 is a schematic side view of a portion of an electrically initiated airbag.

FIG. 8 is a side view of a portion of an electrically initiated airbag 53. A coaxial electrical wire 60 carries an electrical signal from the thermal battery 58 to the airbag 53. The electrical signal passes through a glass to metal seal and a ferrite capacitor 61 installed for HERO (Hazards of Electromagnetic Radiation to Ordnance) purposes. The electrical signal resistively heats the bridgewire thereby igniting the ignition charge 62, which in turn ignites the delay charge 63. After the delay, the delay charge 63 activates the primary charge 64 which activates the output charge 65. The output charge 65 produces gases that break the burst disk 66 and then fill and expand the airbag 53.

While the invention has been described with reference to certain preferred embodiments, numerous changes, alterations and modifications to the described embodiments are possible without departing from the spirit and scope of the invention as defined in the appended claims, and equivalents thereof.

What is claimed is:

1. A method of removing a canopy from a cockpit of an aircraft, comprising:

providing an airbag in the cockpit adjacent the canopy;

inflating the airbag; and as the airbag inflates, applying a force to the canopy from the inflating airbag to thereby jettison the canopy.

2. The method of claim 1 further comprising initiating the airbag prior to inflating the airbag.

3. The method of claim 2 wherein the initiating step includes initiating the airbag with gas.

4. The method of claim 2 wherein the initiating step includes initiating the airbag with a light signal.

5. The method of claim 2 wherein the initiating step includes initiating the airbag with an electrical signal.

6. The method of claim 1 wherein the airbag is mounted to a cockpit seat.

7. The method of claim 1 wherein the airbag is mounted to the canopy.

8. The method of claim 1 wherein the airbag is mounted to an airframe of the aircraft.

9. An apparatus, comprising:

an aircraft having a cockpit and a canopy covering the cockpit;

an airbag mounted in the cockpit adjacent the canopy; and an initiator connected to the airbag for initiating the airbag to jettison the canopy.

10. The apparatus of claim 9 wherein the initiator is a gas initiator.

11. The apparatus of claim 9 wherein the initiator is a laser initiator.

12. The apparatus of claim 9 wherein the initiator is an electrical initiator.

13. The apparatus of claim 9 further comprising a cockpit seat in the cockpit and wherein the airbag is mounted to the cockpit seat.

14. The apparatus of claim 9 wherein the airbag is mounted to the canopy.

15. The apparatus of claim 9 wherein the aircraft comprises an airframe and wherein the airbag is mounted to the airframe.

* * * * *